(12) United States Patent
Friedl et al.

(10) Patent No.: US 6,315,186 B1
(45) Date of Patent: Nov. 13, 2001

(54) CONTROL DEVICE FOR A WELDING APPARATUS

(75) Inventors: Helmut Friedl, Sipbachzell; Franz Niedereder, Fischlham, both of (AT)

(73) Assignee: FROMIUS Schweissmaschinen Produktion GmbH & Co. KG, Pettenbach (AT)

( * ) Notice: Subject to any disclaimer, the term of this patent is extended or adjusted under 35 U.S.C. 154(b) by 0 days.

(21) Appl. No.: 09/600,186

(22) PCT Filed: Jan. 8, 1999

(86) PCT No.: PCT/AT99/00003

§ 371 Date: Aug. 4, 2000

§ 102(e) Date: Aug. 4, 2000

(87) PCT Pub. No.: WO99/36219

PCT Pub. Date: Jul. 22, 1999

(30) Foreign Application Priority Data

Jan. 13, 1998 (AT) .......................................... 34/98

(51) Int. Cl.[7] .................................................. B23K 9/10
(52) U.S. Cl. ........................................ 228/102; 219/130.1
(58) Field of Search .................. 228/102, 8; 219/130.21, 219/130.1, 130.31, 130.33, 130.32, 130.5, 130.51, 132, 137 PS; 710/100, 105, 101, 126; 700/169, 168

(56) References Cited

U.S. PATENT DOCUMENTS 4,144,992 * 3/1979 Omae et al. .
5,458,048 * 10/1995 Hohner .
5,717,385 * 2/1998 Kogure .
5,837,968   11/1998 Rohrberg et al. .
5,941,966 * 8/1999 Gotze et al. .
5,966,308 * 10/1999 Kazirskis et al. .
5,978,593 * 11/1999 Sexton .

FOREIGN PATENT DOCUMENTS 0 463 489   6/1991 (EP) .
WO 91/01842   2/1991 (JP) .

OTHER PUBLICATIONS

X.M. Zeng et al, "High–frequency TIG–welding Power Supply with Microprocessor Control", IEEE Proceedings A, vol. 137, No. 4, Jul. 1990, XP000132845 (Herts, GB).

* cited by examiner

*Primary Examiner*—Tom Dunn
*Assistant Examiner*—Jonathan Johnson
(74) *Attorney, Agent, or Firm*—Collard & Roe, P.C.

(57) ABSTRACT

The invention relates to a control device (4) for a welding apparatus (1) or a welding facility, comprising a welding torch (10) connected to the welding apparatus (1) via connecting lines, wherein at least one input device (22) and/or a display device (23) are arranged on the welding torch (10). The control device (4) is connected to a serial data bus, in particular a field bus, to which the welding torch (10) and/or additional components of the welding apparatus (1) and/or the welding facility are attached.

22 Claims, 2 Drawing Sheets

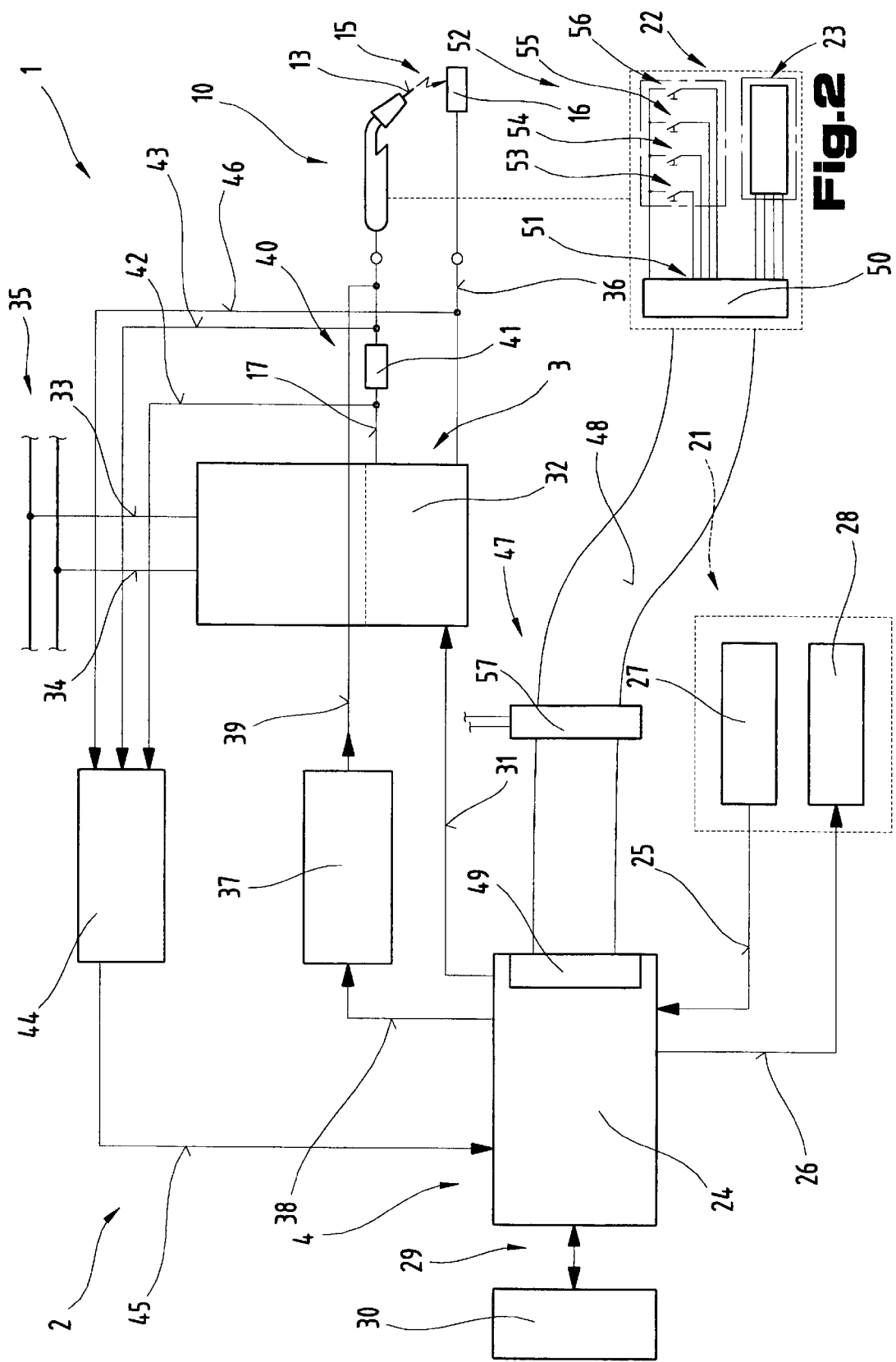

CONTROL DEVICE FOR A WELDING APPARATUS

The invention relates to a control device for a welding apparatus.

Control devices for welding devices are already known, in which an input device and a display device are provided on the welding torch. The individual operating elements of the input device and the display device are directly connected via lines to the control device, in particular the microprocessor of the welding torch, so that a control procedure can be initiated from the welding torch by operating one of the operating elements of the welding torch. Any changes or adjustments activated are displayed on the display device on the welding torch so that the user can take a reading of the changes from the display device at any time. The disadvantage of this arrangement is that a plurality of lines are needed to connect the individual operating elements to the control device, which means that a correspondingly thick conduit pack is needed to connect the welding apparatus to the welding torch, thereby restricting the flexibility of the welding torch during use.

The underlying objective of this invention is to provide a control device which allows a simple transmission of data between the welding torch and the welding apparatus.

This objective of the invention is achieved by providing a data bus or a field bus, a serial data transmission can be operated with any number of control sequences or control procedures between the welding torch and the welding apparatus. Another advantage resides in the fact that by using a data bus, many welding torches of different types can be connected to the welding apparatus since there is no longer any need to modify the hardware to suit the different welding torches because the welding apparatus can be extended by making simple adjustments to the software.

Another embodiment offers advantages because the lines between the active and passive components and the input device and output device are kept short, thereby keeping external influences on the lines to a minimum.

An advantage is to be gained by using a standardised data bus, a connection with external control devices or with PCs can be set up at any time.

The advantage is that the number of lines needed for the data transmission can be reduced whilst simultaneously operating several components by means of the bus line system.

An advantageous embodiment is because any number of different control sequences can be transmitted to the welding apparatus via the input device or output device.

Another advantage is because any number of operating elements can be provided on the welding torch whilst requiring only a small number of lines for the data bus in order to transmit data.

An advantage is also to be had by using a standardised data bus, any number of welding torches can be connected to the welding apparatus, offering the user a high degree of flexibility.

An embodiment offers an advantage in that the control device can be automatically adapted to the respective welding torch.

An advantageous embodiment provides a welding apparatus with an appropriate data bus that is inexpensive to manufacture.

Also of advantage is when new developments emerge in welding torches or if a different welding torch is used, the software in the welding apparatus simply has to be changed in order to be able to connect the welding torch to a welding apparatus of an older design.

The advantage to be gained from an embodiment is that it offers the option of networking several control devices with the control device of the welding apparatus so that a production sequence can be accessed through the control device of the welding apparatus.

An embodiment is also advantageous because it offers a simple means of providing a data transmission in which external effects can be largely be avoided by using an optical conductor.

The advantage is that it provides the user with an additional input option.

An embodiment is of advantage because the lines needed for data transmission can be reduced.

Finally, an embodiment is of advantage because it allows the user to change at least one welding parameter during the welding process, thereby enabling optimum adaptation of the welding process to the most varied of conditions.

The invention will be described in more detail below with reference to an example of an embodiment illustrated in the drawings.

Of these:

FIG. 2 is a block diagram of the welding apparatus with the welding torch providing a simplified, schematic illustration.

Figure 1:
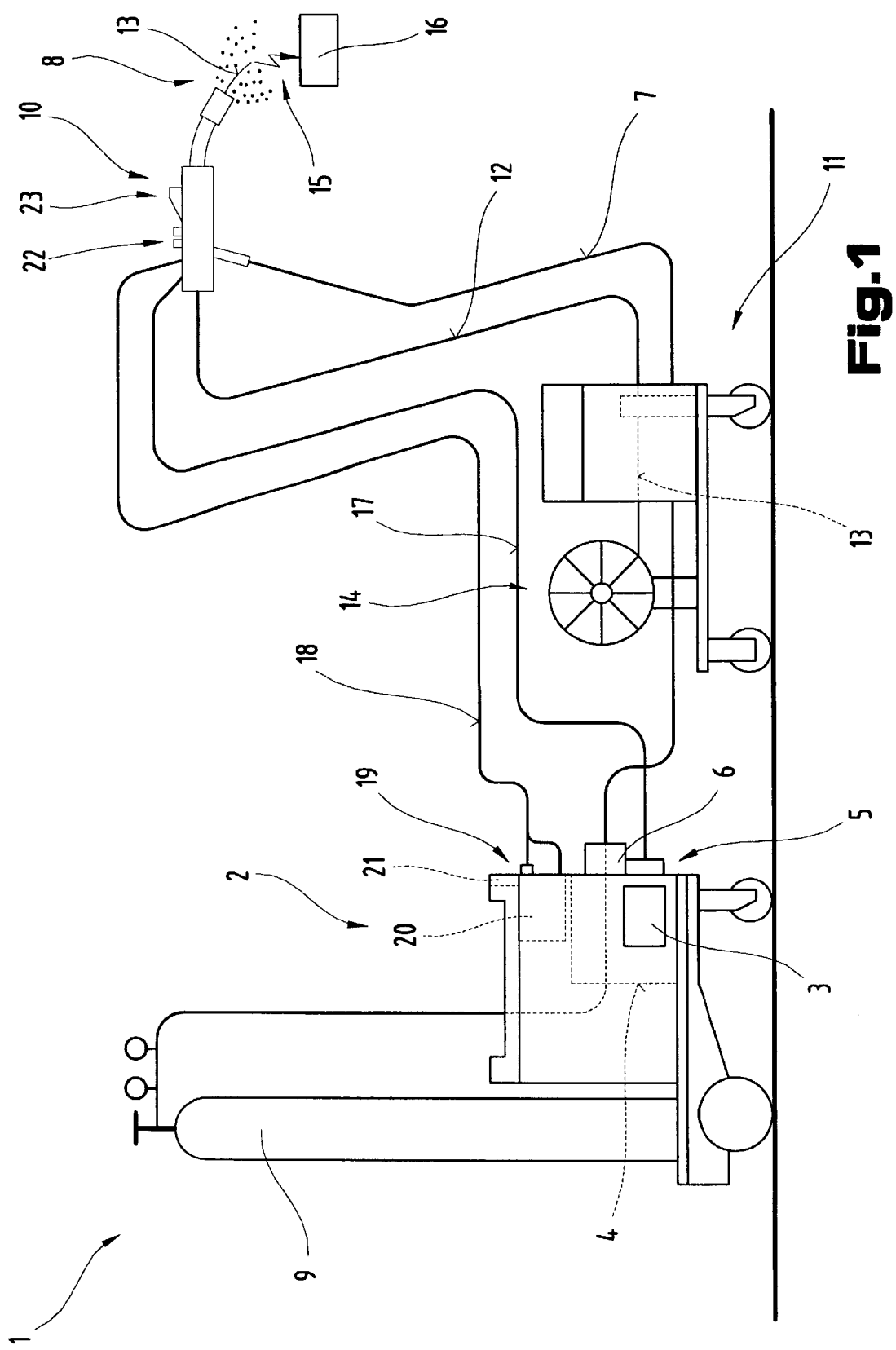
FIG. 1 is a schematic diagram showing the structure of the welding apparatus.

Firstly, it should be pointed out that in the embodiment described, the same reference numbers and the same component names are used to refer to the same components and the disclosures made throughout the description can he transposed in terms of meaning to same components with same reference numbers and same components names. The details of positions chosen for the purpose of the description, e.g. top, bottom, side, etc., also refer to the drawings actually being described and can be transposed in terms of meaning to the new position when a different position is being described. The individual characterising features disclosed during the description of the embodiment may also be regarded as independent solutions proposed by the invention in their own right.

FIG. 1 shows a welding apparatus 1 for the most varied of welding processes, e.g. MIG/MAG welding and TIG welding. The welding apparatus 1 comprises a current source 2 a with a power component 3, a control device 4 and a switching element 5 assigned to the power component 3 and the control device 4. The switching element 5 or the control device 4 is connected to a control valve 6, which is arranged in a supply line 7 for a gas 8, in particular an inert gas such as $CO_2$, helium or argon and similar, for example, between a gas storage 9 and a welding torch 10.

Another wire feed device 11 of the type commonly used for MIG/MAG welding may also be controlled via the control device 4, in which case a welding wire 13 is fed from a supply drum 14 to the region of the welding torch 10 via a supply line 12. The current needed to build up an arc 15 between the welding wire 13 and a workpiece 16 is delivered by means of a supply line 17 from the power component 3 of the current source 2 to the welding torch 10 and the welding wire 13.

The welding torch 10 can be cooled by means of a cooling circuit 18, in which case the welding torch 10 can be connected via an intermediately connected flow relay 19 to a water container 20 and the cooling circuit 18 is switched on by the control device 4 when the welding torch 10 is activated in order to cool the welding torch 10 and the welding wire 13.

In addition, the welding apparatus 1 has an input and/or display device 21, by means of which the most varied of welding parameters and operating modes can be set for the welding apparatus 1. The welding parameters set from the input and/or display device 21 are forwarded to the control device 4, from which the individual components of the welding apparatus 1 are controlled.

Clearly, instead of the welding torch 10 being connected to the individual components by individual lines as in the embodiment illustrated, in particular to the welding apparatus 1 and the wire feed device 11, these individual lines could be placed together in a conduit pack and connected to the welding torch 10.

The welding torch 10 also has an input device 22 as well as a display device 23. From the input device 22 and the display device 23, when running a welding process, the operator can use the display device 23 to take readings of the welding parameter settings and the input device 22, having individual push buttons or similar, to influence or amend the individual welding parameters, so that the welding process can be optimised via the welding torch 10. Clearly, the operator can also change the set welding parameters from the input device 22 during the welding process so that the welding process can be optimised at any time.

FIG. 2 is a block diagram of the welding device 1 in a simplified form.

The control device 4 is preferably a micro-controller 24. The input and/or display device 21 is connected to an input of the control device 4, in particular the micro-controller 24, via several lines 25, 26, although only one each of these lines 25, 26 is shown in the diagram for the sake of clarity. However, the input and/or display device 21 could also be set up as separate areas, in other words as an input device 27 and a display device 28. To this end, a keyboard or any other type of input facility, e.g. a potentiometer, touchscreen or conventional push buttons, may be used with the input device 27. The operator can select the individual welding parameters from the individual components of the input device 27 and set them on the welding apparatus 1 using the appropriate keys so that a corresponding welding process can be set and run using the desired welding parameters for the different welding processes.

The display device 28 may be a display indicator, a LED display, a LCD display, a digital display, a monitor or a touchscreen and the selected welding parameters, in particular the respective values, can be displayed for the user on the display device 28. Data is exchanged between the input and/or output device 21, in particular the input device 27 and the output device 28, via the lines 25, 26, i.e. when the input device 27 is operated, a corresponding signal is transferred to the control device 4, whereupon the control device 4, in particular the micro-controller 24, runs a corresponding control sequence. At the same time and afterwards, the display device 28 is switched on by the control device 4 via the line 26 and the corresponding value and the signal transferred from the control device 4 is displayed on the display device 28.

Connected to other inputs and outputs of the micro-controller 24, for example, are a bus system 29, which may comprise address and data lines, and a memory 30. The individual items of data and programmes, in particular the application programme, needed to set the welding apparatus 1 are memorised in the memory 30. Additional user-defined data may also be stored and held in the memory 30. To this end, the user may activate a corresponding element of the input device 27 in order to store welding settings for the welding apparatus 1 in the memory 30 so that this data can be retrieved or the welding apparatus 1 configured.

In order to control a corresponding welding process from the control device 4, the control device 4 is connected via at least one line 31 to the power component 3 and data is exchanged between the power component 3 and the control device 4 via the line 31. Several lines 31 may be provided for this purpose, although only one line 31 is shown in the drawing for the sake of clarity. The power component 3 may be provided in the form of a primary clocked inverter current source 32. To supply the power component 3 with current and voltage, the power component 3 is connected to a voltage supply network 35 via supply lines 33, 34. Clearly, any other type of energy source could be used to supply the power component 3 instead of the voltage supply network 35, for example a battery. It would also be possible to set up the voltage supply network 35 through a two-phase network or a three-phase network.

The purpose of the power component 3 is to convert the energy supplied by the voltage supply network 35 into a corresponding welding energy in a manner which is known from the prior art and this aspect of converting the supplied energy will therefore not be discussed here. To set up the welding current circuit with the welding torch 10, the power component 3 is connected via the supply line 17 to the welding torch 10, whilst the workpiece 16 is also connected to the power component 3 by means of another supply line 36 so that a current circuit can be set up via the welding torch 10, in particular via the welding wire 13 and the workpiece 16.

To ignite the arc 15 between the welding wire 13 and the workpiece 16, the welding apparatus 1 may have a high-frequency generator 37, for example. It is connected via lines 38, 39 both to the control device 4 and to the supply line 17 for the welding torch 10. Clearly, the arc 15 could also be ignited by any other method known from the prior art. In order to be able to ignite the arc between the welding wire 13 and the workpiece 16 via the high-frequency generator 37, a high-frequency signal is emitted by the control device 4 when the welding process is activated, which is then modulated to the welding energy and thereby ignites the arc 15.

In order to enable the welding process to be monitored, a measuring device 40 is provided in the supply line 17. The measuring device 40 may be a shunt 41 known from the prior art so that the flow of current across the supply line 17 can be detected by the measuring device 40. Lines 42, 43 at each end of the shunt 41 are connected to the supply line 17 for this purpose. The lines 42, 43 are then connected to a converter 44. The converter 44 converts the measured analogue signal into a digital signal, which it then transmits via lines 45 to the control device 4. Clearly, the converter 44 could also be designed so that it will amplify the measured signal, in which case the signal will not be converted into a digital signal as before but will be amplified by a value which can be pre-set.

To enable the voltage at the welding torch 10 and between the welding wire 13 and the work-piece 16 to be detected in addition, another line 46 is connected to the converter 44 and the supply line 36. The purpose of the converter 44 is to convert the analogue values or signals measured by the measuring device 40 between the welding wire 13 and the workpiece 16 into digital values or signals or to amplify and then forward the analogue signals to the control device 4 so that the values or signals picked up by the control device 4 can then be processed.

The control device 4 also has a data bus 47 or a field bus. The control device is connected to the data bus 47, in particular the field bus, to which the welding torch 10 and/or other components of the welding apparatus 1 and/or the welding unit can be connected, such as a welding robot, a welding automaton, a production device, a production line, a rotary table, etc. The data bus 47 may be provided as a CAN, Interbus-S, Profibus, etc., and may have a serial interface, in particular an RS 232, RS 485, etc. The data bus 47 is provided between the control device 4 and the welding torch 10 by means of a bus line system 48, consisting of at least two electric lines. At least two branch devices are connected to the bus line system 48, consisting of the individual components for the data transfer via the data bus 47 and therefore referred to as interface drivers 49, 50, thereby connecting the input 22 and/or output device 23 to the control device 4. To this end, the welding torch 10 has the individual components needed to transfer data across the bus line system 48, this area being indicated by broken lines in the drawing.

If the data bus 47 used to handle the exchange of data with the control device 4 is a data bus 47 known from the prior art, for example a RS 232, the other interface driver 50 with the associated function modules is provided in the welding torch 10, as schematically illustrated. In the welding torch 10, this now offers an option whereby corresponding operating elements 52, in particular individual push buttons 53 to 56, can be provided on analogue and/or digital inputs and/or outputs 51. The individual components needed to transfer data via the data bus 47, such as a display driver, the analogue and/or digital inputs and/or outputs 51, the interface driver 50, etc., are provided in the welding torch 10.

Furthermore, it is also possible to connect the display device 23 to the interface driver 50 so that data relating to the display mode can also be transferred via the interface driver 50.

By providing individual operating elements 52 for the input device 22, the user will now be able to retrieve and set the most varied of operating sequences and welding parameters via the welding torch 10, which will in turn be displayed on the welding torch 10 by means of the display device 23, i.e. when a key 53 to 56 is operated, a signal is transmitted from the interface driver 50 across the bus line system 48 to the control device 4, after which the control device 4 applies a change to the operating state accordingly and then forwards this change in turn via the interface driver 49 to the bus line system 48, after which the interface driver 50 generates a corresponding control signal for the display device 23, thereby enabling the operator to take a reading from the display device 23 of the change applied.

By connecting the welding torch 10, in particular its input device 22 and display device 23, to the control device 4 via the data bus 47, it will now be possible to dispense with some of the lines otherwise used to communicate between the welding torch 10 and the control device 4 because of the serial data transfer, since only a few lines, for example two to nine lines, are needed for serial data transmission. The data is transferred via the serial data bus 47 using an appropriate transfer protocol and any transfer protocol known from the prior art may be used.

Advantageously, because the active and passive components needed for the data transfer are arranged in the welding torch 10, a large number of different types of welding torch 10 can be used with one and the same welding apparatus 1, i.e. for example rather than using a welding torch 10 having four push buttons 53 to 56—as in the example illustrated— with a corresponding interface driver 50, for example a RS 232, a welding torch 10 can be used which has more than four push buttons 53 to 56 so that special functions can also be performed via the welding torch 10 without the need for additional lines and control lines. This is possible because when the additionally provided pushbuttons 53 to 56 are operated, the functions and changes to be applied are transmitted via the serial data bus 47 with the same transfer protocol, which means that any number of push buttons 53 to 56 can be used. The control device 4 then evaluates the transmitted data so that the control device 4 can perform the control and adjustment procedures corresponding to the transferred data.

The welding apparatus 1 no longer has to be adapted to handle the different range of welding torches 10 because only the software and programmes stored in the memory 30 have to be customised to the individual welding torches 10 since the most varied of welding torches 10 can transfer data with the standardised transfer protocol. For example, when buying a new welding torch 10, the user will be supplied with a corresponding update floppy disk which he can then insert in the in a floppy disk drive integrated in the welding apparatus 1 or connected to the welding apparatus 1 and edit the software stored in the memory 30 by transferring the data across the data bus 47 by connecting the data bus 47 to a computer, after which the user will then be able to use the corresponding welding torch 10 at any time. Alternatively, the programmes and software of the welding apparatus 1 may also be set up to operate the most varied of welding torches 10 so that the user merely has to connect the welding torch 10 to the conduit pack and to the welding apparatus 1, after which the user will be able to use all the functions of the welding torch 10 for a welding process.

Clearly, it would also be possible to provide in the control device 4 a memory 30 which can be overwritten and edited and load software, in particular the application programmes, in the memory 30 so that the software can be accessed via an interface, in particular via the data bus 47 enabling changes to be made to the software at any time.

The advantage of using a set-up of this type is that any number of desired welding torches 10 can be used for one and the same welding apparatus 1, affording the user a relatively high degree of flexibility. For this purpose, it would also be possible for an automatic recognition process to be run when a welding torch 10 is changed.

This could be set up in such a way that a code is stored in the welding torch 10 which is automatically sent from the interface driver 50 to the data bus 47 whenever the welding torch 10 is switched on during operation of the welding apparatus 1 so that this code will be transferred to the control device 4. The control device 4 then compares the code transmitted from the welding torch 10 with the code held in the memory 30 and if there is a match the control device 4 will be able to read additional data tagged to this code from the memory 30 thereby recognising the type of welding torch 10.

Another alternative which may be used for the same purpose is that the control device 4 can run an operating system adjustment and an application programme adjustment depending on the welding torch 10 connected to the welding apparatus 1, i.e. corresponding predefined settings can be downloaded from the welding parameters in the memory 30 by the control device 4, thereby optimising the welding process. Furthermore, different types of welding torches 10 may be provided with different input devices 22 and/or display devices 23 as required, in which case the most varied of welding torches 10 may be run, for example having a memory element which can be coupled with the data bus 47 for defining or storing a code assigned to the type of welding torch 10, so that the welding torch 10 can be automatically recognised.

In the case of the embodiment illustrated here, for example, the push button 53 could be assigned to the task of increasing the value indicated on the display device 23, in particular a LCD display, whilst the push button 54 could be used to reduce this value, i.e. when the user depresses the push button 53, the value may increase from 50 to 60, for example. This can be done by depressing the push button 53 in steps, causing data to be transferred via the interface driver 50 to the control device 4, whereupon the control device 4 will activate the power component 3 via the line 38.

The other push buttons 55, 56 may be used for selecting different welding parameters, for example, i.e. when the push button 55 is operated, for example, the display device 23 will skip from the welding parameter for the current value to the wire diameter etc., so that the set or 30 predetermined wire diameter will be displayed on the display device 23. By depressing the push button 55, the user can scroll through the individual welding parameters. For this purpose, the push buttons 55 and 56 could be used for scrolling through the welding parameters in different directions. By using a welding torch 10 of this type, the user will have the option of being able to select and set all the welding parameters available for the welding torch 10.

The difference between welding torches 10 known from the prior art and a welding torch 10 with an integrated input device 22 and display device 23 resides in the fact that with the welding torches 10 used in the existing art, individual operating elements 52 have to be connected directly to the control device 4, in particular the micro-controller 24, i.e. when using a welding torch 10 of the prior art with a torch key, an up and down key, a potentiometer, a LED display and a 7-segment display, for example, these operating elements 52 are connected to the micro-controller 24 by individual lines. Because the individual operating elements 52 are connected to the control device 4 directly by individual terminals, a plurality of lines must be run via the conduit pack to the welding apparatus 1, making the conduit pack that much thicker and thereby reducing the flexibility of the welding torch 10. A major disadvantage of the known welding torches 10 resides in the fact that if different welding torches 10 are needed for each range of functions performed by the individual welding torches 10, the welding apparatus 1, in particular the current source 2, has to be configured for different sizes and ratings accordingly, to allow a large number of different welding torches 10 to be connected to the welding apparatus 1.

Furthermore, with the systems known from the prior art in which the operating elements 52 are connected directly to the control device 4, when it is necessary to change the function of a welding torch 10, a change also has to be made in the welding apparatus 1, in particular in the electronics, which complicates matters when using a newly developed welding torch 10. In order to guarantee fault-free operation, the individual driver modules used to suppress the lines are connected directly to the individual operating elements 52 and to the display device 24. Because of the large number of lines needed for the individual operating elements 52, the system required to prevent interference of the lines is complex, requiring the welding torch 10 to be of a larger construction and in turn limiting the flexibility of the welding torch 10.

Since the different add-on components used with the different welding torches 10 may require different connectors and control cable loads in the case of the welding torches 10 of the prior art, the welding apparatus 1 requires a corresponding hardware design in order to handle the different welding torches 10, which significantly increases the costs of welding apparatus 1 of this type. With the design used for welding torches 10 of the prior art which have individual lines connected directly to the control device 4, the functions of the welding torch 10 are also restricted since in order to produce a welding apparatus 1 that is not excessively expensive, it can not be designed to handle every welding torch 10 because, to handle the broadest range of welding torches 10, the hardware in the welding apparatus 1 would have to be designed to handle the broadest range of terminals and variants of operating elements 52, leading to a significant increase in costs, i.e. a different hardware control system is needed for a welding torch 10 with only two push buttons 53, 54 than that required if using a welding torch 10 with four or more push buttons 53 to 56, since a welding torch 10 with only two push buttons 53, 56 will need at least two or three lines running to the control device 4 whilst a welding torch 10 with four push buttons 53 to 56 will need at least four or five lines running to the control device 4, and the hardware of the welding apparatus 1 will therefore have to be designed for operation with the different types of welding torches 10.

By providing the welding torch 10 with a data bus 47, the interfaces and the transfer protocol used to exchange data between the welding apparatus 1 and the welding torch 10 can be standardised so that one standardised torch connector can be used for the most varied of welding torches 10 and the serial data transfer means that the number of lines between the welding apparatus 1 and the welding torch 10 does not have to be increased to cope with the different functions of the welding torch 10. By using the design of welding torch 10 proposed by the invention and connecting the welding torch 10 to the welding apparatus 1 via the data bus 47, the system of entering settings remotely from a remote controller to change the welding parameters as used in the prior art can be dispensed with since the welding torch 10 can be designed to run the most varied of functions and there is therefore no need for a remote setting system and a remote controller. Because only a few lines, for example from two to nine lines, are used for the data transfer, the conduit pack used to connect the welding torch 10 to the welding apparatus 1 may advantageously be of a very slim design, thereby affording the operator greater flexibility and allow data to be transferred reliably over long distances, as would be necessary if the welding apparatus were used in a shipyard, for example.

When a new welding torch 10 is released, capable of performing different additional functions and special functions, there is no need to make any hardware changes in the welding apparatus 1 because data is transferred serially by means of the standardised data bus 47 and any number of operating elements 52 and any number of display devices 23 can be provided in the welding torch 10, i.e. because of the serial transfer of data, the individual operating procedures performed from the welding torch 10 are converted by means of the interface driver 50 into a serial data signal and into a predetermined transfer protocol which is fed via the bus line system 48 to the control device 4, which means that a new development available in a welding torch 10 can be applied by using the standardised data bus 47 and in turn the standardised connection system, thereby obviating the need for a hardware modification.

Another advantage of the design of welding apparatus 1 and welding torch 10 proposed by the invention resides in the fact that the individual active components can be provided in the welding torch 10, since only a small number of lines are needed for the serial data transfer and any interference picked up in the bus line system 48 can be filtered out directly in the welding torch 10 enabling fault-free data transmission across the bus line system 48. Clearly, it would also be possible to filter out interference using an appropriate software or by software means.

Different variants of the welding torch 10 can also be set up because data transfer across the bus line system 48 is standardised and only the operating system and the software of the welding apparatus 1 have to be adapted to new variants of the welding torch 10, a hardware modification in the welding apparatus 1 no longer being necessary. A design of this type will bring considerable cost savings for the user because a user wanting to introduce new types of welding torches 10 can link up to the old welding apparatus 1 via the data bus 47 without incurring costs for hardware modifications in the welding apparatus 1. Because of the serial data transfer, savings can be made on individual control lines of the bus line system 48 since only a small number of lines will be needed due to the standardised data transfer, in particular the serial data transfer.

Costs can be saved on developments of welding torches 10 because a standardised set-up can be used to bring the active and passive components together in the region of the welding torch 10 enabling the circuit design to be standardised, which means that the same design with different functions can be used again and again for the most varied of welding torches 10.

Using a data bus 47 in the welding apparatus 1 also offers the option of being able to use it to control external components, i.e. if using a welding apparatus 1 in a welding robot or a welding automaton, for example, the welding apparatus 1, in particular the control device 4, can be coupled with the welding robot or the welding automaton, in particular the control system thereof, via the data bus 47, so that data can be exchanged between the welding apparatus 1 and the welding robot or the welding automaton. To this end, if using the welding apparatus 1 in a production line or a production device in the automotive industry, for example, the welding apparatus 1 can also be used to control the system of conveying the individual components, i.e. when a welding procedure is complete, the welding apparatus 1 will issue a signal via the data bus 47 of the production line or the production device, in particular the control device or SPS control or computer control used for the production line or production device, so that the control device will know that the welding, process has been terminated by the welding apparatus 1 and will therefore move along the component that has just been processed.

If an external interface is provided, it can also be used to connect the welding apparatus 1 to a computer so that the software can be edited via the data bus 47. Furthermore, if the control device 4 and the standardised data bus 47 are provided in the welding apparatus 1 and if the welding apparatus 1 is used in an assembly operation involving other components, for example a rotary table, etc., these can be controlled via the control device 4 of the welding apparatus 1, obviating the need for additional devices to control the other components.

Another advantage of using a data bus 47 is that other components needed for the welding apparatus 1, such as the wire feed device 11 etc., can also be controlled via a data bus 47 and the bus line system 48. In FIG. 2, for example, this is represented by another interface driver 57 provided in the data bus 47, i.e. by connecting the wire feed device 11 to the interface driver 57, a serial data exchange can be run between the control device 4 and the data feed device 11. The advantage of this resides in the fact that the wire feed device 11 no longer has to be connected by lines directly to the control device 4—as is the case with the prior art—and instead, control can be managed through a standardised data bus 47, thereby saving on lines and ensuring a reliable transfer of data. This also makes it possible to use different wire feed devices 11 since using the data bus 47 means that the software in the control device 4 merely has to be changed in order to adapt to the wire feed device 11.

Clearly, it would also be possible to provide several additional interface drivers 57 on the data bus 47, in particular a bus line system 48, allowing as many components as required to be controlled by the control device 4 via the data bus 47.

Naturally, it would also be possible to use any transfer system known from the prior art instead of the electric data bus 47, i.e. instead of using electric lines, it would also be possible to use one or more optical conductors so that the data would be transferred by optical conductors, thereby offering a high degree of prevention against interference since electrical influences would no longer have to be taken into account if the data were transferred via optical conductors. If a data bus 47 were set up on optical conductors in this manner, the individual interface drivers 49, 50 and 57 would have to be configured to the respective line system.

It would also be possible to provide different types of welding torches 10 with different input devices 22 and/or display devices 23 as appropriate, in which case branching devices of the same type, in particular interface drivers 49, 50, 57 would have to be connected to the data bus 47, allowing a plurality of differently designed welding torches 10 to be used.

Moreover, the data bus 47 may be connected to an external operating device. To this end, the operating device will incorporate the input 22 and/or display device 23 so that the welding apparatus 1, in particular the settings for the individual welding parameters, can be controlled from the operating element. The operating element in this case can be connected to the welding apparatus 1, in particular to the data bus 47, separately from the conduit pack and may have its own conduit pack. Furthermore, the operating device can be designed in such a way that it can be connected to the welding torch 10 by means of a retaining device or other securing means, for example. To this end, as with the embodiment described above, the input device 22 and/or the display device 23 could be connected to the control device 4 during the welding process in order to transmit control signals via the data bus 47 so that the welding parameters can also be changed during the welding process, thereby enabling the operator to adapt the welding process to optimum conditions.

Clearly, the data transfer, at least in part-regions of the welding apparatus 1, to the components of the welding apparatus 1, in particular the welding torch 10, or external components, could be performed wirelessly, e.g. by means of light signals such as infrared signals. Again, a standardised or standard transfer protocol would be used for the wireless data transmission from the individual components, giving the user a high degree of flexibility when using a welding apparatus 1 of this type. To this end, if using several welding apparatuses 1, it would also be possible to assign each welding apparatus 1 its own code so that the data would be allocated on the basis of the code. This code would be stored by each component of a welding apparatus 1 in a non-volatile memory, for example, and on receiving data, each component would be able to switch on and run, having firstly filtered out this code and run through and operated a corresponding control procedure.

In addition to the data bus 47, the welding torch 10 may also have operating elements 52 which are also connected directly to the control device 4, in particular the micro-controller 24, being directly connected to the control device 4 via lines, i.e. it is possible to run a parallel operation between the input device 22 and the operating elements 52 connected directly to the control device 4. The advantage of this approach is that if the data bus 47 fails, the basic functions of the welding torch 10 are maintained so that the user can run a welding process at any time. To this end, the user may change the welding parameters from the input and/or display device 21 on the welding apparatus 1. With a layout of this type, the welding torch 10 is usually directly connected to the control device 4 only by means of those operating elements 52 which are absolutely necessary to run a welding process, such as the push buttons used to start a welding process, since the welding parameters can be changed by the user from the welding apparatus 1 at any time.

Finally, it should be pointed out that the individual parts of the embodiment described are illustrated schematically and have been enlarged out of proportion in order to provide a clearer understanding of the solution proposed by the invention. Furthermore, individual parts of the combination of features described in relation to the embodiment may be combined with other individual features to constitute independent solutions to the invention in their own right.

Above all, the individual embodiments of the object of the invention illustrated in FIGS. 1; 2 may be considered as independent solutions to the invention. The tasks and proposed solutions are to be found in the detailed descriptions of these drawings.

What is claimed is:

1. A control device for a welding apparatus or for a welding facility, comprising a welding torch connected to the welding apparatus via connecting lines, at least one input device and/or display device being provided on the welding torch, characterised in that the control device is connected to a field bus to which the welding torch, the welding facility and, as required, other components of the welding apparatus are connected.

2. A control device as claimed in claim 1, characterised in that the individual components required to transfer data via the data bus, including a display driver, analogue inputs, analogue outputs, digital inputs and digital outputs, an interface driver, are provided in the welding torch.

3. A control device as claimed in claim 1, characterised in that the data bus is a CAN, Interbus-S, Profibus and has a serial interface.

4. A control device as claimed in claim 1, characterised in that the data bus is a bus line system between the control device and the welding torch, to which at least two branching devices, comprised of interface drivers are connected.

5. A control device as claimed in claim 1, characterised in that the input device provided in the welding torch is connected to the control device via the data bus.

6. A control device as claimed in claim 1, characterised in that the operating elements are connected to the data bus by means of analog inputs.

7. A control device as claimed in claim 1, characterised in that different types of welding torches are provided with different input and/or devices as required, each being provided with branching devices, of the same type for connecting to the data bus.

8. A control device as claimed in claim 1, characterised in that a memory element which can be connected to the data bus is provided in the welding torch in order to define and store a code assigned to the type of the welding torch.

9. A control device as claimed in claim 1, characterised in that the control device is a micro-controller.

10. A control device as claimed in claim 1, characterised in that the control device has memories, which can be overwritten and amended, for the software, which can be connected to an interfaces.

11. A control device as claimed in claim 1, characterised in that the control device of the welding apparatus is connected via the data bus to at least one control device of at least one external component, including a welding robot or a welding automaton.

12. A control device as claimed in claim 1, characterised in that the bus line system comprises one or more optical conductors.

13. A control device as claimed in claim 1, characterised in that the data bus is connected to an external operating device in which the input device is arranged.

14. A control device as claimed in claim 1, characterised in that data is transferred wirelessly, by means of an optical signal, at least in part-regions.

15. A control device as claimed in claim 1, characterised in that the input device is connected to the control device during the welding process in order to transfer control signals via the data bus.

16. A control device as claimed in claim 1, characterised in that the output device provided in the welding torch is connected to the control device via the data bus.

17. A control device as claimed in claim 1, characterised in that the operating elements are connected to the data bus by means of analogue outputs.

18. A control device as claimed in claim 1, characterised in that the operating elements are connected to the data bus by means of digital inputs.

19. A control device as claimed in claim 1, characterised in that the operating elements are connected to the data bus by means of digital outputs.

20. A control device as claimed in claim 1, characterised in that different types of welding torches are provided with different display devices, each being provided with branching devices of the same type for connecting to the data bus.

21. A control device as claimed in claim 1, characterised in that the data bus is connected to an external operating device in which the display device is arranged.

22. A control device as claimed in claim 1, characterised in that the display device is connected to the control device during the welding process in order to transfer control signals via the data bus.

* * * * *

UNITED STATES PATENT AND TRADEMARK OFFICE
CERTIFICATE OF CORRECTION

PATENT NO.    : 6,315,186 B1
DATED         : November 13, 2001
INVENTOR(S)   : Friedl et al.

It is certified that error appears in the above-identified patent and that said Letters Patent is hereby corrected as shown below:

Title page,
Item [73], the name of the assignee correctly should read: -- FRONIUS Schweissmaschinen Produktion GmbH & Co. KG --.

Signed and Sealed this

Twenty-first Day of January, 2003

JAMES E. ROGAN
*Director of the United States Patent and Trademark Office*